No. 818,252. PATENTED APR. 17, 1906.
J. E. JONES.
CULTIVATOR.
APPLICATION FILED FEB. 1, 1905.

2 SHEETS—SHEET 1.

Witnesses
Phil O. Barnes
G. S. Elmore

Inventor
Jesse E. Jones
By Victor J. Evans
Attorney

No. 818,252. PATENTED APR. 17, 1906.
J. E. JONES.
CULTIVATOR.
APPLICATION FILED FEB. 1, 1905.

2 SHEETS—SHEET 2.

Witnesses
Phil E. Barnes

Inventor
Jesse E. Jones.
By Victor J. Evans
Attorney

UNITED STATES PATENT OFFICE.

JESSE E. JONES, OF SYCAMORE, INDIANA.

CULTIVATOR.

No. 818,252.      Specification of Letters Patent.      Patented April 17, 1906.

Application filed February 1, 1905. Serial No. 243,717.

*To all whom it may concern:*

Be it known that I, JESSE ELMER JONES, a citizen of the United States, residing at Sycamore, in the county of Howard and State of Indiana, have invented new and useful Improvements in Cultivators, of which the following is a specification.

This invention relates to a rotary harrow or cultivator, and has for its objects to produce a comparatively simple inexpensive device of this character which in practice will effectually pulverize the soil and remove weeds or other objectionable growths therefrom, one which will not become choked in action, and one in which the harrow or cultivator frame may be readily raised and thrown out of action when circumstances require.

With these and other objects in view the invention comprises the novel features of construction and combination of parts more fully hereinafter described.

Figure 1:
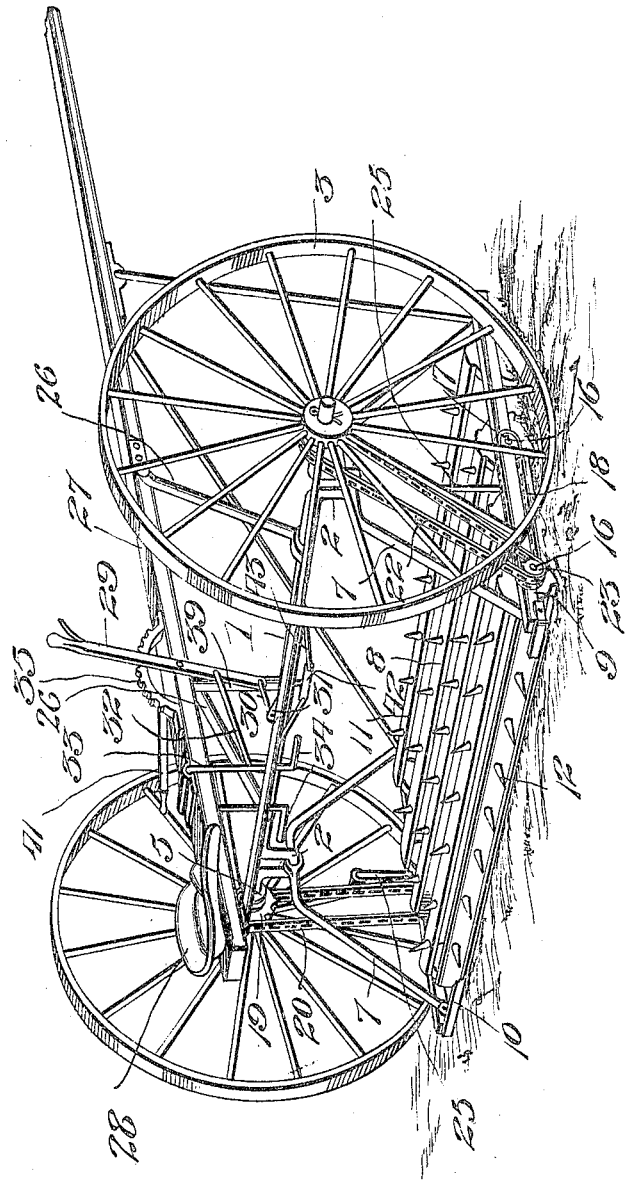
Figure 2:
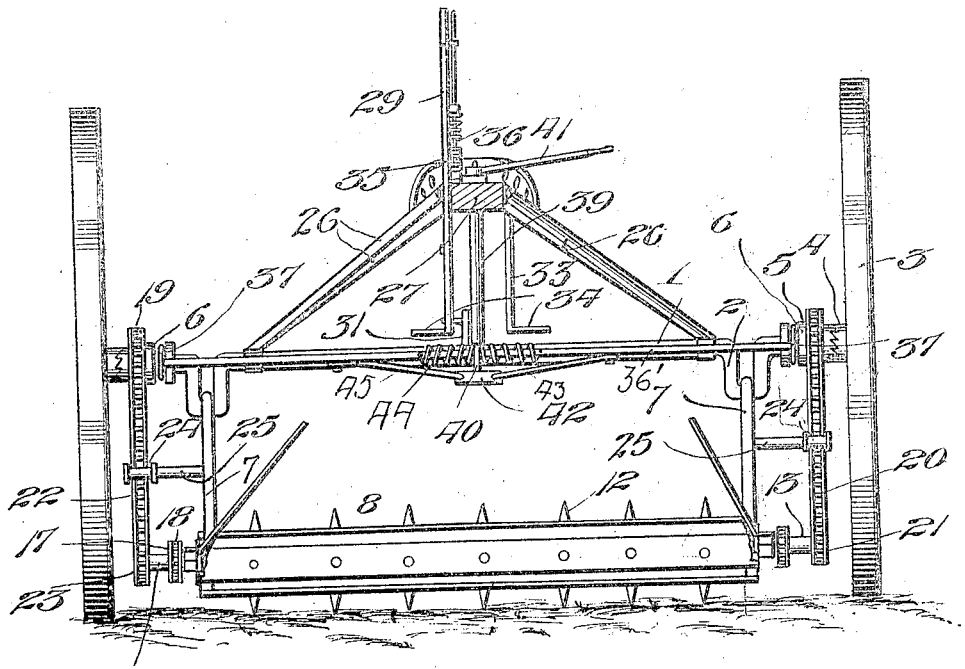
Figure 3:
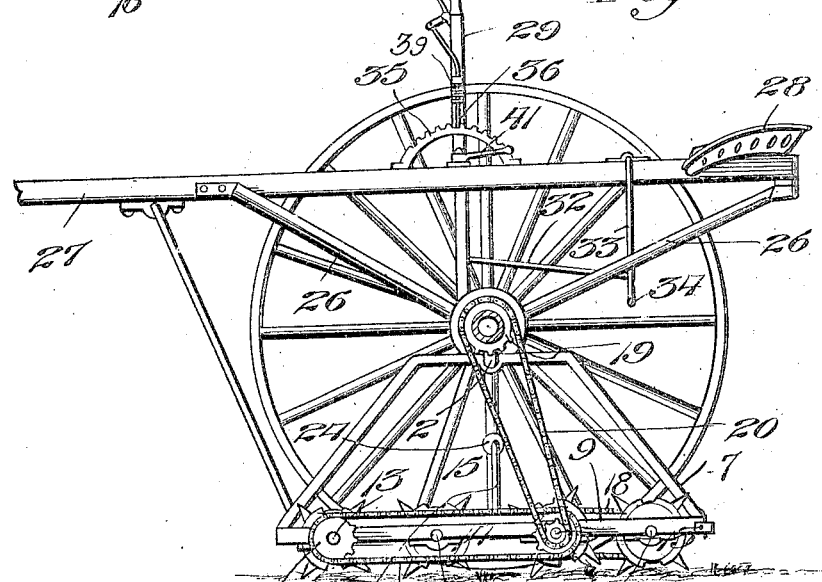

In the accompanying drawings, Figure 1 is a perspective view of a harrow embodying the invention. Fig. 2 is a front elevation, partly in section, of the same. Fig. 3 is a side elevation of the device.

Referring to the drawings, 1 designates an axle provided with eccentric portions or crank-bends 2 and carrying rotary transporting-wheels 3, arranged for free rotation upon the ends of the shaft, there being fixed to the inner ends of the hubs of said wheels clutch members or sleeves 4, while upon the shaft 1 there are mounted for rotation and for sliding movement longitudinally of the shaft clutch members or sleeves 5, having at their outer ends clutch-teeth adapted to mesh with corresponding teeth upon the sleeves 4 and adjacent their inner ends peripheral grooves 6 for a purpose which will hereinafter appear.

Suspended from the axle 1 by means of substantially U-shaped hangers 7 is a frame 8, comprising end bars 9 and front and rear connecting-bars 10, there being arranged for rotation within the frame a plurality (preferably four) of parallel tubular bars or rollers 11, appropriately spaced transversely and equipped with teeth or spikes 12. The rollers 11, which have end journals bearing in the frame-bars 9, are preferably of the form herein shown and each equipped with four rows of teeth 12, projecting from the roller at diametrically opposite points, while the hangers 7 are pivotally suspended within the crank-bends 2 of the axle, thus adapting them for free oscillation and the frame 8 to conform readily to surface irregularities during the operation of the machine.

The axles or journals 13 of the first and third rollers 11 project beyond the outer face of the end bar 9 at one end of the frame and have fixed thereon suitable sprocket-wheels 14, which receive a sprocket-chain 15, thus connecting said pair of rollers for simultaneous and uniform rotation, while the journals or axles 16 of the second and fourth rollers likewise project beyond the outer face of the bar 9 at the other end of the frame and carry fixed sprockets 17, adapted to receive a sprocket-chain 18, whereby these rollers are also adapted for corresponding rotation, it being noted, however, that all of the rollers will rotate in the same direction and at a corsponding rate of speed.

Fixed upon the clutch-sleeves 5 for rotation therewith are sprocket-gears 19, one of these gears being connected by a chain 20 with a sprocket-wheel 21, fixed upon the axle of the third roller 11, while the other gear 19 is connected by a chain 22 with a sprocket-pinion 23, fixed upon the journal 16 of the fourth roller 11, whereby the pairs of connected toothed rollers will be driven positively by the respective ground-wheels when the clutch members 4 and 5 are in engagement, there being arranged to bear upon one flight of each of the chains 20 22 an antifriction-roller 24, carried by a substantially L-shaped member or standard 25, fixed to and arising from the adjacent end bar 9 of the frame and serving to exert a pressure for taking up slack in the chain and maintaining the latter in proper engagement with the teeth of the sprocket-gear and pinion.

Connected with the axle are frame-bars 26, which serve to support a tongue or pole 27, having mounted upon its rear end a driver's seat 28. Pivoted to the tongue 27 at a point in advance of the axle 1 is a lever 29, connected at its lower end by means of a link 30 with a crank-arm 31, fixed upon the axle, this lever being further connected at a point below its fulcrum by a link 32 with a foot-lever 33, pivotally suspended upon the tongue 27 immediately in advance of the driver's seat, there being provided on the lever 33 stirrups 34 to be engaged by the feet of the operator, while upon the tongue 27 there is fixed at a convenient point a segmental rack 35 to be engaged by a pawl 36 on the lever 29, whereby the lever may, as usual, be locked in its adjusted positions. It is apparent that when the lever 29 is released and swung rearward the crank-arm 31 will be moved forward, thus rotating the axle and through the medium of the crank portions 2 and hangers 7 raise the frame 8 from the ground to an inactive position.

Extending parallel with the axle 1 is a pair of reversely-slidable clutch-operating rods or members 36′, provided at their outer ends with yokes 37, adapted to seat, respectively, in the grooves 6 of the clutch members 5, these rods being slidably mounted at their inner ends in bearings 38, provided at the lower end of a fixed tubular bearing-sleeve 39, carried by and depending from the tongue 27. Arranged for rotation within the bearing-sleeve 39 is a vertical actuating member or shaft 40, having fixed to its upper end an operating-lever 41 and to its lower end a horizontal arm or head 42, the opposite ends of which are connected, by means of links 43, with the respective rods 36′, while upon these rods are mounted normally expanded springs 44, bearing at their inner ends upon the bearings 38 and at their outer ends upon pins or abutments 45, fixed to the rods, these springs serving to force the rods normally outward and maintain the clutch members 5 in engagement with the companion members 4.

In practice, supposing the parts to be in normal active position, as illustrated herein, motion will during the travel of the machine over the ground be transmitted from the wheels 3 through the medium of the intermediate gearing to the toothed rollers 11, which latter will be driven at a comparatively high rate of speed, thus causing the teeth 12 to thoroughly pulverize the soil. When, however, it is desired to throw the machine out of action, the operator engages the upper end of lever 29 and releases and swings the latter rearward, as heretofore mentioned, at the same time by means of his feet moving the lower end of lever 33 forward, this action serving to rock the axle and swing the frame 8 upward, as above described. After the frame has been elevated the operator grasps the outer end of lever 41 and swings the latter rearward for rotating the shaft 40 in the proper direction for acting through the medium of the links 43, to move the rods 36′ inward against the action of the springs 44 and disconnecting the clutch members 5 from the companion members 4, whereby the operating-gearing will be thrown out of action, as will be readily understood.

Having thus fully described the invention, what is claimed as new is—

In a device of the class described, an axle having a pair of substantially U-shaped crank-bends, ground-wheels journaled on the axle, U-shaped hangers pivoted on the latter within the crank-bends and held thereby against longitudinal movement on the axle, a frame suspended for oscillation by the hangers, a plurality of rollers journaled for rotation in the frame and provided with teeth, sprocket-wheels fixed upon the ends of the rollers, a chain connecting said wheels for driving the rollers one from another, a chain-and-sprocket connection between one of the rollers and ground-wheels, a crank-arm fixed on the axle, an operating-lever sustained on the machine and connected with said arm, said lever being operable for rotating the axle to raise or lower the roller-carrying frame, and foot-levers pivoted on the machine and connected with the arm, said levers having stirrups to receive the feet of the operator for moving the foot-levers to raise or lower the roller-frame.

In testimony whereof I affix my signature in presence of two witnesses.

JESSE E. JONES.

Witnesses:
THOMAS E. WINDSOR,
C. B. JONES.